UNITED STATES PATENT OFFICE.

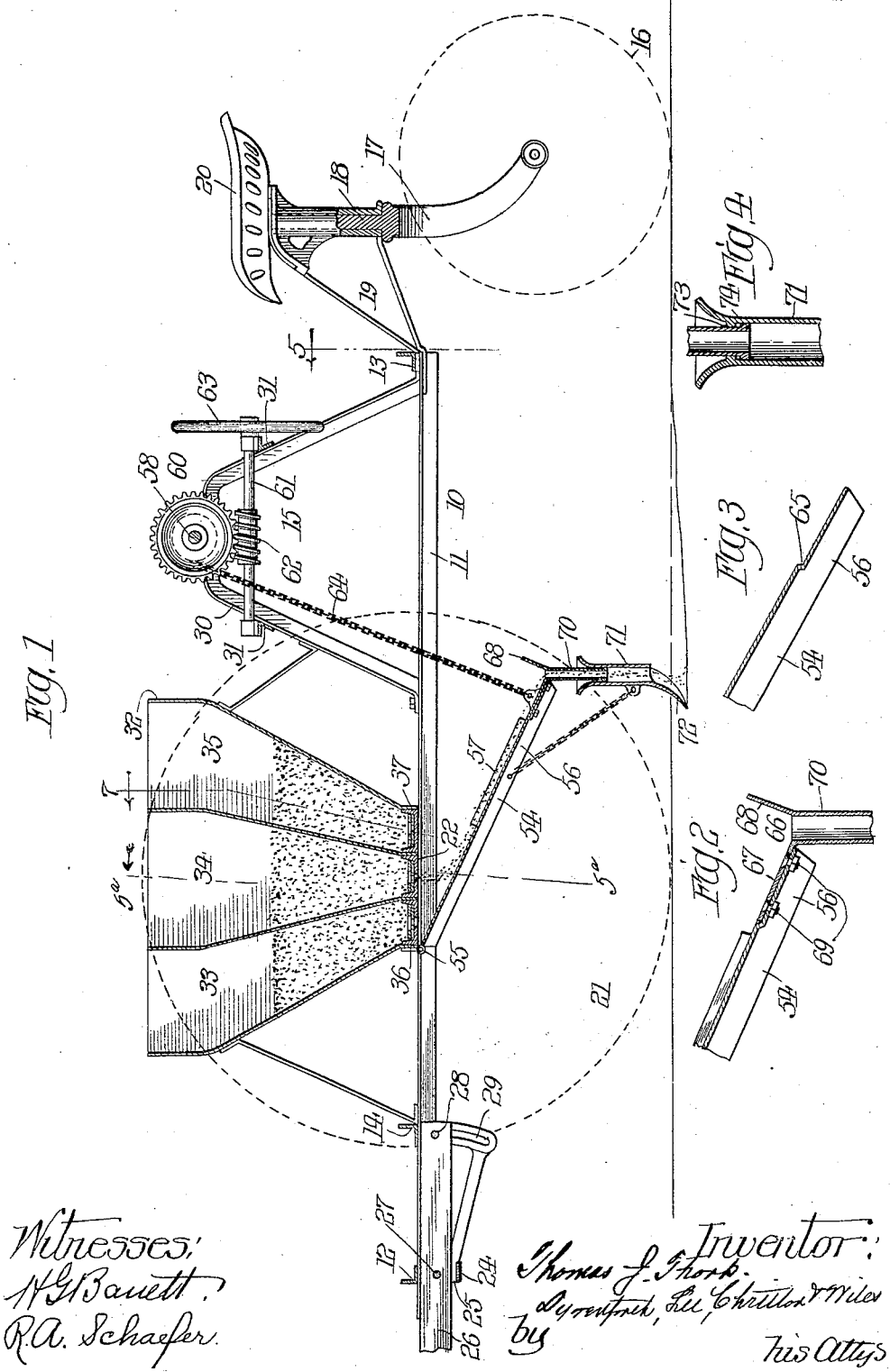

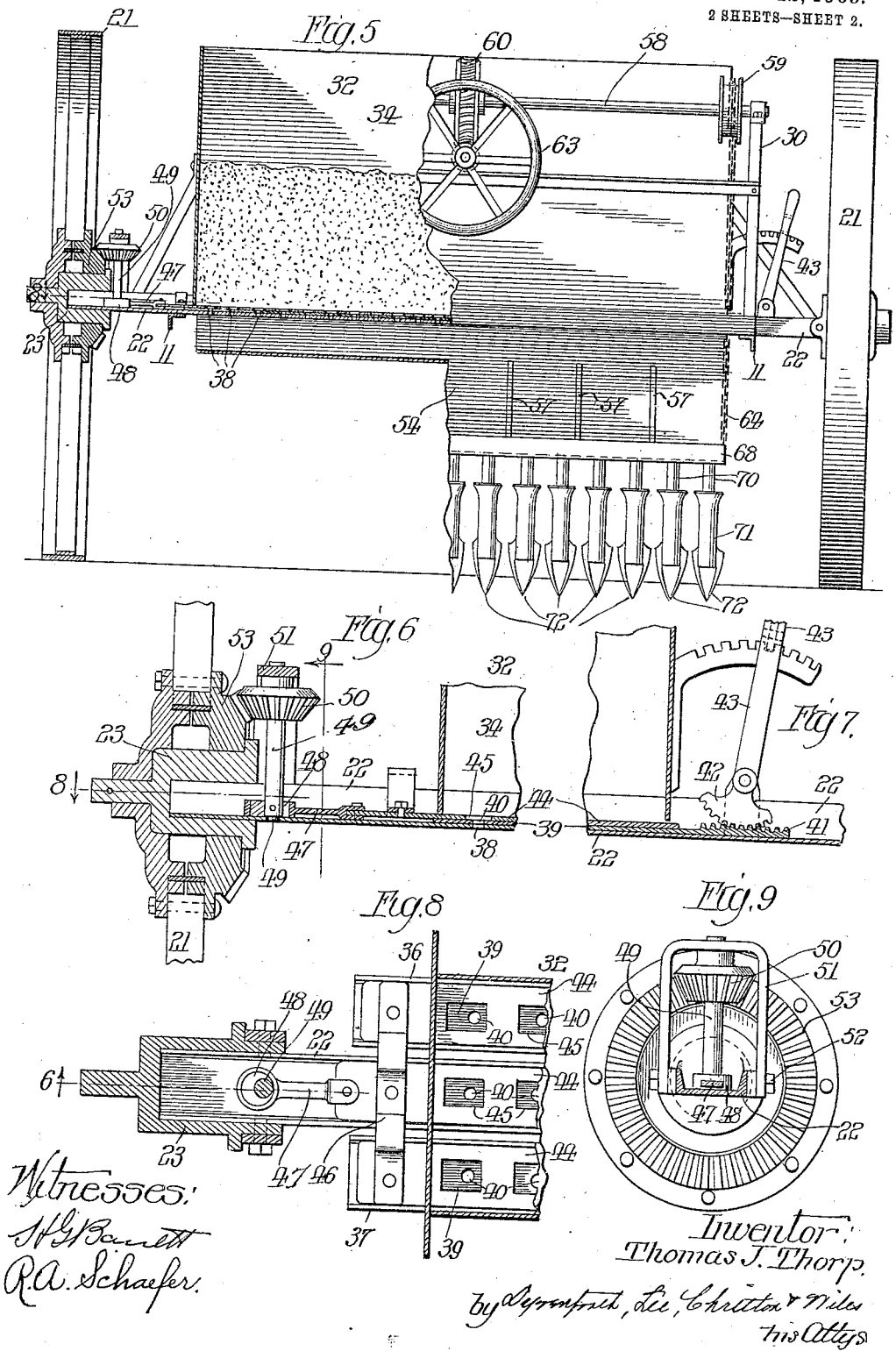

THOMAS J. THORP, OF CORVALLIS, OREGON.

SEEDING AND DRILLING MACHINE.

No. 909,478.  Specification of Letters Patent.  Patented Jan. 12, 1909.

Application filed June 24, 1907. Serial No. 380,626.

*To all whom it may concern:*

Be it known that I, THOMAS J. THORP, a citizen of the United States, residing at Corvallis, in the county of Benton and State of Oregon, have invented a new and useful Improvement in Seeding and Drilling Machines, of which the following is a specification.

My invention relates particularly to seeding-machines; and my primary object is to provide a machine of the character indicated of improved general construction.

Figure 1 shows by a view in longitudinal vertical section, a machine embodying my improvements. Fig. 2 is a similar broken view, slightly enlarged, of the lower end of the apron and upper end of one of the seed-chutes. Fig. 3 is a similar view of the lower end of the apron with the seed-chute removed. Fig. 4 is a similar view of the upper end of a hollow seed-shoe or drill. Fig. 5 is a view in rear elevation of the machine shown in Fig. 1, the right-hand side of the view being taken from the position indicated by the line 5 on Fig. 1 and viewed in the direction of the arrow, and the left-hand side taken at a point indicated at the line 5ᵃ on Fig. 1 and viewed in the direction of the arrow. Fig. 6 is a broken vertical section of the left-hand side of the machine taken, as indicated, at the line 6 of Fig. 8 and viewed in the direction of the arrow. Fig. 7 is a similar view of the right-hand side of the machine taken as indicated at the line 7 on Fig. 1 and viewed in the direction of the arrow. Fig. 8 is a broken enlarged section taken at the line 8 on Fig. 6 and viewed in the direction of the arrow; and Fig. 9 is a section taken at the line 9 on Fig. 6 and viewed in the direction of the arrow.

In the construction illustrated 10 represents a main frame comprising side-members 11, a front-cross-member 12, a rear cross-member 13, a cross-member 14 located a short distance in the rear of the member 12, and a supplemental frame 15 for supporting the apron-elevating device, hereinafter described. The frame is supported at its rear end by a wheel 16 journaled in a fork 17 having a stem 18 journaled in a bracket 19 secured to the main frame, and surmounting the bracket 19 is a seat 20 for the operator. The main frame is supported near its front end by two wheels 21 journaled at opposite sides thereof, as hereinafter described.

In the construction shown, the side-members 11 are connected together by a transversely extending channel-bar 22, which is equipped at its ends, as shown in Figs. 5 and 6, with stub-axles or journals 23 upon which the wheels 21 are journaled. Connected with the cross-members 12 and 14 is a casting 24 having a channel 25 for receiving the tongue, or pole, 26 of the machine. The pole 26 is pivotally supported on the front end of the member 24 by means of a pivot 27 and the rear end of the pole is equipped with a stud 28, the ends of which move in slots 29 struck in the member 24 about the pivot 27 as an axis.

The supplemental frame 15 comprises members 30 supported on the rear portion of the side-members 11 of the main frame, and cross-members 31 connecting the members 30 near the upper ends thereof.

The seeding mechanism comprises a hopper 32, divided into transverse chambers 33, 34 and 35. The channel-bar 22 which forms a part of the axle of the machine constitutes a bottom for the chamber 34; and, as shown most clearly in Fig. 8, channel-bars 36 and 37, flanking the bar 22, are provided to afford bottoms for the chambers 33 and 35, respectively. The webs of said channel-bars are horizontally disposed and are provided with a series of openings 38. Within the channel-bars and resting upon the webs thereof, are adjustable plates 39 provided with a series of perforations 40 adapted to register with the openings 38. The plates 39 project past one end of the hopper 32, as shown in Fig. 7, and each is equipped with a rack 41, with which mesh the teeth of sectors 42 equipped with operating levers 43. The levers 43 may be locked in any desired position in a well-known manner, as illustrated in Fig. 7. It will be understood that by means of the levers 43 the plates 39 may be independently adjusted with relation to the bottom plates upon which they rest, thereby providing for the regulation of the size of the discharge-openings of the hopper-chambers. Above the adjustable plates 39 are slides 44 provided with openings 45, as shown in Fig. 8. The ends of the slides project past one end of the hopper 32 and are rigidly joined together by a connecting member 46. The central slide-bar 22 is joined by a connecting rod 47 to an eccentric 48, secured on a vertical shaft 49 operated by a bevel-gear 50. The lower end of the shaft 49 is journaled in the channel-bar 22, and the upper end is journaled in the web of a yoke 51 which is secured to the channel-bar 22, by bolts 52. The gear 50 meshes with a bevel-gear 53 formed integrally with the hub of one of the wheels 21. It will thus be understood that when the wheel 21 rotates, motion will be communicated through the vertical shaft 49, eccentric 48 and the connecting-rod 47 to the slide of the seeder.

The several chambers in the hopper 32 are provided to enable several kinds of seed, or material, to be distributed in one seeding operation. To further aid in accomplishing this purpose, and to mix the seed or material preparatory to their discharge from the machine, I provide an apron, or plate, 54 which is pivotally connected by means of hinges 55 with the front lower corner of the hopper 32. The apron 54 is adapted to serve as a closure for all of the discharge-openings of the several chambers of the hopper, in a manner hereinafter explained. The rear edge of the apron projects rearwardly some distance beyond the bottom of the hopper, affording an extension 56, which is equipped on its upper surface with cleats 57 preferably arranged in parallel series, as shown, which, as illustrated in Fig. 5, are spaced to guide the seed on the apron and prevent lateral drifting thereof, in the event that the machine may be operating on a side-hill, or when in a high wind.

The elevating mechanism for raising and lowering the apron for the purpose hereinbefore mentioned, comprises a transverse shaft 58 journaled in the supplemental frame 15 and equipped at its ends with drums 59 and intermediate its ends with a worm-wheel 60; a longitudinal shaft 61 journaled in the frame 15 and equipped with a worm 62 engaging the wheel 60 and with an operating-wheel 63; and chains 64 attached to the apron at its opposite ends and connected with the drums 59, whereby when the wheel 63 is rotated the apron will be raised or lowered depending upon the direction of rotation.

As an adjunct to the machine described, I provide means for sowing the seed in drills which comprises the following construction: The rear edge-portion of the apron 54 is struck down throughout its length, as represented at 65, in Fig. 3, for the purpose of connection with a removable seed-drill device. This device comprises a channel-bar 66 having front and rear flanges 67 and 68, respectively, the flange 67 fitting the struck-down portion of the apron in which it is releasably secured, as by bolts 69, and the flange 68 extending upwardly to form a stop for the grain in its descent from the apron, the bottom of this channel-bar being provided with a longitudinal series of seed-chutes 70, each of which is open at both ends. Secured on the lower end of each chute 70 is a tubular drill-point, or shoe, 71 having a forwardly turned toe 72, as shown in Fig. 1. Each drill 71 has an annular internal flange 73 near its upper end forming a stop coöperating with an external flange 74 on the lower end of the chute carrying the shoe, this construction allowing the drills to have a vertical movement independent of the chutes.

From the foregoing detailed description, the operation will be readily understood. The several chambers of the hopper may be preparatorily filled with different kinds of seeds, or two of said chambers may be filled with different kinds of seeds, and one of said chambers may be filled with fertilizer. The adjustable plates 39 may be preparatorily adjusted to give the desired feeding action. When the machine is started the apron 54 may be lowered, in the described manner, to an inclined position, whereupon the seed will be distributed broadcast upon the ground, when the drill mechanism is not employed. When the drill-mechanism is employed the seed or fertilizer, or both, as the case may be, will descend on the apron and be discharged through the chutes 70 and drill-shoes 71, and into the furrows provided in the ground by the action of the drill-shoes.

What I claim as new and desire to secure by Letters Patent is—

1. In a machine of the character set forth, the combination of a frame, a plurality of hopper-chambers mounted on the frame to extend transversely thereof, and an inclined substantially flat apron located beneath said chambers and adapted to receive material directly from the discharge-openings of said hopper-chambers.

2. In a machine of the character set forth, the combination of a frame, a plurality of hopper-chambers mounted on the frame to extend transversely thereof, an inclined substantially flat apron located beneath said chambers and adapted to receive material directly from the discharge-openings of said hopper-chambers, and means for regulating the discharge of the material from the several hopper-chambers, for the purpose set forth.

3. In a machine of the character set forth, the combination of a frame, a hopper mounted thereon having a plurality of chambers extending transversely of the frame, and a swingingly mounted apron having a substantially flat upper surface on said machine, said apron being adapted to be swung and maintained in inclined position for receiving material directly from the discharge openings of said outer chambers and delivering it at its lower edge-portion, for the purpose set forth.

4. In a machine of the character set forth, the combination of a frame, a hopper mounted thereon having a plurality of chambers extending transversely of the frame, a substantially flat inclined apron adapted to receive material directly from the discharge-openings of said hopper-chambers, and means for simultaneously discharging material from all of said hopper-chambers upon said apron, for the purpose set forth.

5. In a machine of the character set forth, the combination of a frame, a hopper mounted thereon having a plurality of chambers extending transversely of the frame, and a substantially flat inclined apron provided with guides on its upper surface and adapted to receive material directly from the discharge-openings of said hopper-chambers.

6. In a machine of the character set forth, the combination of a frame, a hopper mounted thereon having a plurality of chambers extending transversely of the frame, a plurality of independently adjustable plates provided with discharge-openings, and a substantially flat inclined apron extending below said chambers and adapted to receive material directly from the discharge-openings of said hopper-chambers, for the purpose set forth.

7. In a machine of the character set forth, the combination of a frame, a hopper having a plurality of chambers extending transversely of the frame and provided with bottoms having a series of discharge-openings therein, independently adjustable register plates mounted upon said bottoms to extend longitudinally thereon, a plurality of slide-bars surmounting said register plates and extending substantially parallel thereto and provided with discharge-openings, said slide-bars being secured to move together, and means actuated by one of the wheels of the machine for moving said slide-bars, for the purpose set forth.

8. In a machine of the character set forth, the combination of a frame, a hopper mounted thereon, an apron adapted to receive material from said hopper through its discharge-opening, and a drill device adapted to receive seed from the lower portion of the apron.

9. In a machine of the character set forth, the combination with a frame and hopper, of an apron adapted to assume an inclined position, and a drill-device removably connected with said apron.

10. In a machine of the character set forth, the combination of a frame, a hopper mounted thereon, an apron adapted to receive material from said hopper through its discharge-opening, a trough connected with the free edge of said apron, a series of chutes connected with the trough, and drill-shoes into and through which the material is discharged from the chutes.

11. In a machine of the character set forth, the combination of a frame, a hopper mounted thereon, an apron adapted to receive material from said hopper through its discharge-opening, chutes on the lower end of said apron, a stop-plate beyond said chutes, and drill-shoes on the lower ends of said chutes, provided with forwardly inclined points, for the purpose set forth.

12. In a machine of the character set forth, the combination of a frame, a hopper mounted thereon, an apron hinged to the machine to extend below said hopper and constructed to be swung to close the hopper-opening, and lowered to open it, for the purpose set forth.

13. In a machine of the character set forth, the combination of a frame, a hopper mounted thereon, an apron hinged at one edge to the machine to extend below said hopper and constructed to be swung to close the hopper-opening and lowered to open it, and windlass mechanism for operating said apron.

14. In a machine of the character set forth, the combination with a frame and hopper, of an apron adapted to assume an inclined position, a trough on the lower end of said apron, a series of depending chutes leading from said trough, and drill-shoes slidably mounted on the ends of said chutes.

15. In a machine of the character set forth, the combination with a frame and hopper, of an apron adapted to assume an inclined position, and a drill-device removably connected with said apron comprising a trough having chutes depending therefrom, drill-shoes slidably confined on the ends of said chutes, and chains connected with the machine and drill-shoes.

THOMAS J. THORP.

In presence of—
RALPH A. SCHAEFER,
J. H. LANDES.